United States Patent Office 3,450,764
Patented June 17, 1969

3,450,764
PREPARATION OF HYDROXY SUBSTITUTED DIARYLAMINES
Elmar R. Altwicker, Somerville, N.J., assignor to Universal Oil Products Company, Des Plaines, Ill., a corporation of Delaware
No Drawing. Filed May 23, 1966, Ser. No. 551,944
Int. Cl. C07c 85/06
U.S. Cl. 260—571                                                16 Claims

ABSTRACT OF THE DISCLOSURE

Use of benzene and naphthalene sulfonic acids to catalyze the reaction of arylamines with dihydroxy aryl compounds to produce hydroxy substituted diarylamines.

---

This invention relates to a process for preparing hydroxy substituted diarylamines and more particularly relates to the preparation of such compounds using an aryl sulfonic acid to catalyze the reaction of an arylamine and a dihydroxy aryl compound.

Hydroxy substituted diarylamines are valuable chemicals finding wide utility in industry, for example, as rubber antioxidants. These compounds are prepared in general by reacting a dihydroxy aryl compound and an arylamine, for example, a dihydric phenol and a phenylamine to prepare hydroxy diphenylamines. This well known reaction is usually effected in the presence of a catalyst which comprises a large class of materials such as strong mineral acids, for example, sulfuric, hydrochloric or phosphoric acids or metallic halides, for example, aluminum, zinc or ferric chlorides. Use of these catalysts, however, and particularly strong acid catalysts, usually results in a further reaction of the desired hydroxy substituted product with the amine reactant to form N,N'-diarylarylenediamines, for example N,N'-diphenyl-phenylenediamines in the reaction of dihydric phenols and phenylamines. This side reaction induced by the strong acid catalysts has the undesirable effect of consuming the desired product in the formation of sludge-like residues which, aside from lowering the yield of the desired product, also presents serious recovery and separational problems which add considerably to the over-all cost of preparing the valuable hydroxy substituted diarylamines. It has now been discovered, however, that a strong acid catalyst comprising an aryl sulfonic acid may be utilized to catalyze this reaction and, unexpectedly, without the concomitant formation of substantial quantities of further reaction products. This discovery permits the ready attainment of hydroxy substituted diarylamines in high yield, free of tarry residues and in an economic and industrially desirable manner.

Accordingly, an object of this invention is to provide an improved process for preparing hydroxy substituted diarylamines. Another object of this invention is to provide a process for preparing such compounds by reacting a dihydroxy substituted aryl compound with an arylamine in the presence of an aryl sulfonic acid whereby a high yield of the desired hydroxy substituted product is obtained without the concomitant formation of substantial quantities of undesired, yield reducing, side products.

The dihydroxy substituted aryl compounds which may be reacted according to the process of this invention include dihydroxy compounds of both the benzene and napthalene series including, for example, 1,3-dihydroxynaphthalene, 1,4-dihydroxynaphthalene, 2,6-dihydroxynaphthalene, 3-hydroxyphenol or 4-hydroxyphenol. The dihydroxy compounds may be substituted with groups such as alkyl or halo and examples of such substituted dihydroxy compounds include 2-ethyl-1, 4-dihydroxynaphthalene, 1-chloro-2, 6-dihydroxynaphthalene, 3-methyl-4-hydroxyphenol or 5-chloro-3-hydroxyphenol. The arylamines which may be reacted with the dihydroxy aryl compounds are preferably primary amines and include arylamines of both the naphthalene and benzene series including, for example, 1- or 2-naphthylamine or phenylamine. The arylamines may be substituted but preferably should not be substituted, particularly with bulky groups, in the ring positions adjacent to the amino group inasmuch as such substituted amines because of steric hindrance effects normally do not react as well as amines having such positions open or free of bulky groups. The arylamines may be substituted with groups such as halo, alkyl or alkoxy and examples of such substituted arylamines include 4-methyl-1-naphthylamine, 3-methoxy-1-naphthylamine, 4-chloro-2-naphthylamine, xylidines or toluidines or 3-ethylphenylamine, 4-chlorophenylamine, or 3-methoxyphenylamine. Examples of the hydroxy diarylamines prepared by reacting the above illustrated classes of dihydroxy aryl compounds and arylamines in the process of this invention include N-phenyl-4-hydroxy-1-naphthylamine, N-phenyl-6-hydroxy-2-naphthylamine, N-(4-hydroxyphenyl)-1-naphthylamine, N - naphthyl-4-hydroxy-1-naphthylamine, 4-hydroxydiphenylamine, 3-hydroxydiphenylamine, or N - (2-methylphenyl-4-hydroxyphenylamine, N - (3-methoxyphenyl)-4-hydroxyphenylamine or N-(4-chlorophenyl)-4-hydroxyphenylamine.

The improvements effected according to the process of this invention in preparing hydroxy substituted diarylamines are achieved through utilization of an aryl sulfonic acid as a catalyst for the reaction of a dihydroxy aryl compound and an arylamine. This is quite surprising because, as indicated, use of other strong acids such as sulfuric acid as catalysts usually results in the formation of substantial quantities of undesirable side products including the further reaction product resulting from interaction of the desired hydroxy substituted products with the amine reactant to form, for example, N,N'-diphenyl-phenylenediamine in the reaction of dihydric phenols with phenylamines. This ability of the sulfonic acid catalyst to retard the further reaction of the hydroxy diphenylamine is so great that even when the reaction is under forced conditions, such as prolonged reaction periods, which frequently occurs in industrial operation, the further reaction will not take place to any substantial extent. This high selectivity of sulfonic acid catalysts to effect the principally desired reaction permits, moreover, the desirable feature of preparing mixtures of hydroxy substituted diarylamines by reaction of mixtures of arylamines with a dihydroxy aryl compound without the usual formation of the undesirable further reaction products and even without undesired inter-reaction of the different hydroxy substituted diarylamines. In addition to the unique ability of the sulfonic acid catalysts to catalyze the principally desired reaction without side product formation, the use of such sulfonic acids as catalysts renders the preparational process of this invention highly suitable for industrial utilization because, unlike solid catalysts such as zinc chloride, separation of the acid catalyst from the final reaction mixture is readily and easily achieved by simple washing techniques.

The aryl sulfonic acids which may be used in the process comprise sulfonic acids of both the naphthalene and benzene series including for example 1- or 2-naphthalene sulfonic acid or benzene sulfonic acid. The aryl sulfonic acids may be ring substituted but any substituent or combination of of substituents should not result in a lowering of the strength of the substituted sulfonic acid below that of unsubstituted benzene sulfonic acid. For example, the dissociation constant of benzene sulfonic acid at 25° C. is approximately $2.8 \times 10^{-3}$ and any substituted sulfonic acid used in the reaction should not have a dissociation constant below this value if the desirable results of the process of this invention, namely, obtainment of high yield without substantial side product formation, are to be achieved. Examples of suitable ring substituted sulfonic acids include lower alkyl substituted naphthalene or benzene sulfonic acids such as 4-methyl-1-naphthalene sulfonic acid, 4-ethylbenzene sulfonic acid, or 3-methyl benzene sulfonic acid. Of the various substituted sulfonic acids, a particularly effective and a highly preferred catalyst for the process of this invention, especially for the reaction of phenylamines and dihydric phenols comprises p-toluene sulfonic acid.

The conditions used in effecting the process of this invention are not critical and may be widely varied. In general, the conditions normally utilized for reactions of dihydroxy aryl compounds and arylamines to prepare hydroxy substituted diarylamines may be satisfactorily used in the process of this invention. Generally, the temperature may range from about 100° to 400° C. with a more limited range of about 150° to 250° C., and especially refluxing temperature under atmospheric pressure being preferred. The pressure used in association with such temperature ranges should at least be sufficient to maintain part of the reaction mixture in liquid phase and may range from atmospheric to 50 atmospheres or more. The ratio of the arylamine to the dihydroxy aryl compound may be widely varied but for maximizing yields and convenience of operation the ratio should be within the range of from about 1.5 to 6 mols of the arylamine per mol of the dihydroxy aryl compound with a more limited ratio of from about 1.5 to 4 mols of the arylamine per mol of the dihydroxyl aryl compound being preferred, especially when reacting dihydric phenols and phenylamines to form hydroxydiphenylamines. The duration of the reaction is not too important and the reaction period, depending upon the particular reactants, temperature and quantity of catalyst utilized, usually ranges from about 2 to 10 hours with about 5 hours being typical. As is customary in effecting this type of reaction, the water formed during the reaction is continuously removed from the reaction mixture as it forms, usually as an azeotrope. Collection and measurement of this water can serve as an indicator of the completion of the reaction and when substantially one mol of water has formed per mol of the charged dihydroxy aryl compound, the reaction may be terminated. The amount of aryl sulfonic acid catalyst used will vary depending upon such factors as the specific sulfonic acid used, the reactants and the rate of reaction desired. An amount of sulfonic acid catalyst ranging from about 1 to 35 percent based upon the weight of the dihydroxy aryl compound may be satisfactorily utilized under most circumstances. A more limited range of from about 5 to 15 percent, however, is advantageously used particularly in the reaction of dihydric phenols and phenylamines, especially when using a lower alkyl substituted benzene sulfonic acid, such as p-toluene sulfonic acid, as the catalyst.

The reaction may be effected either in the presence or absence of solvents. Advantageously, however, solvents may be used, particularly as an entraining agent to continuously remove the water formed during the reaction and as a means for regulating the reaction temperature when refluxing temperatures are used. Solvents suitable for this purpose include aromatics such as benzene, xylenes or toluene or halogenated hydrocarbons such as dichlorobenzene. When a solvent is used, the quantity is not important and a quantity of solvent ranging from about 5 to 15 percent based upon the combined weight of the dihydroxy aryl compound and the arylamine is usually sufficient.

The process of this invention may be conducted in a batch- or continuous-type operation. For example, in a batch-type operation and when preparing a hydroxy-diphenylamine, appropriate quantities of a dihydric phenol, a phenylamine, a solvent, if one is used, and an aryl sulfonic acid, for example toluene sulfonic acid, are charged to a reaction vessel equipped with an overhead distillation column and water trap. With stirring the mixture is heated to reflux temperature and maintained thereat until the reaction is complete which is conveniently indicated by the collection of the theoretical quantity of water in the trap. The mixture is then cooled and a solvent such as toluene is added. Then the sulfonic acid catalyst is neutralized and removed from the mixture by washing with an aqueous alkaline solution, for example, a saturated sodium bicarbonate solution. The washed mixture may then be distilled to remove the solvent and the excess phenylamine, and the residue fractionally distilled to recover a high yield of a pure hydroxy diphenylamine.

The following examples are cited to illustrate the process of this invention, but they are not intended to limit the invention to the particular conditions, reactants or sulfonic acid catalyst recited therein.

EXAMPLE I

A hydroxy substituted diphenylamine was prepared according to the process of this invention by the following procedure:

To a reaction flask equipped with an overhead condenser and water trap were charged 110 grams (1 mol) of resorcinol, 186 grams (2 mols) of aniline, 20 grams of p-toluenesulfonic acid and 40 milliliters of xylene. With stirring the mixture was heated to reflux (ranging from about 173° to 200° C.) and maintained thereat until about 19 milliliters of water were collected, a period requiring about 4 hours. The heating was continued for about another hour without any more water being collected. The reaction mixture was cooled, mixed with 800 milliliters of toluene, and the entire mixture was then washed first with a saturated sodium bicarbonate solution until the washings were alkaline and then with a water wash. The washed mixture was then distilled first to about 115° C. at 30 mm. Hg to remove the toluene and xylene, and then to about 175° C. at 10 mm. Hg to remove the aniline. The residue was then fractionated to recover 170 grams of m-hydroxydiphenylamine having a boiling point of 205° to 230° C. at 3 mm. Hg and a melting point of 79° to 81° C. The yield was 92 percent of theory.

EXAMPLE II

A hydroxy substituted diphenylamine was prepared according to the process of this invention by the following procedure:

To a reaction flask equipped with an overhead condenser and water trap were charged 220 grams of resorcinol (2 mols), 372 grams (4 mols) of aniline, 20 grams of p-toluene sulfonic acid and 50 milliliters of xylene. With stirring the mixture was heated to reflux temperature (ranging from about 180 to 197° C.) and maintained thereat until about 38.8 milliliters of water were collected, a period requiring about 6 hours. The heating was continued for another hour without any more water being collected. The reaction mixture was cooled, mixed with a liter of toluene and the combined mixture was then washed first with a saturated sodium bicarbonate solution until the washings were alkaline and then with water. The washed mixture was then distilled to about 150° C. at 20 mm. Hg to remove the xylene and toluene and thereafter fractionated to recover 349 grams of m-hydroxydiphenylamine boiling at 196° to 235° C. at 3 mm. Hg and having a melting point of 81° to 82.5° C. The yield was 94 percent of theory.

EXAMPLE III

A hydroxy substituted diphenylamine was prepared according to the process of this invention by the following procedure:

To a reaction flask equipped with an overhead condenser and water trap were charged 110 grams (1 mol) of resorcinol, 279 grams (3 mols) of aniline, 10 grams of p-toluene sulfonic acid and 35 milliliters of xylene. With stirring the mixture was heated to reflux temperature (ranging from about 174° to 184° C.) and maintained thereat until about 19.5 milliliters of water had been collected, a period requiring about 10 hours. The heating was continued for about another hour without any water being collected. The reaction mixture was cooled, mixed with 800 milliliters of toluene and the entire mixture then washed first with a saturated sodium bicarbonate solution until the washings were alkaline and then with a water wash. The washed mixture was then distilled to 160° C. and 5 mm. Hg to remove the xylene, toluene and aniline. The residue was then fractionated to recover 172 grams of m-hydroxydiphenylamine boiling at 193° to 200° C. at 2 to 3 mm. Hg and having a melting point of 78.5° C. The yield was 93 percent of theory.

EXAMPLE IV

A mixture of hydroxy substituted diphenylamines was prepared according to the process of this invention by the following procedure which also illustrates the selectivity of the sulfonic acid catalyst in retarding further side product formation, even under forced conditions:

To a reaction flask equipped with an overhead condenser and water trap were charged 14.6 grams (0.133 mol) of hydroquinone, 28 grams (0.264 mol) of o-methylaniline, 24.0 grams (0.258 mol) of aniline, and 4.0 grams of p-toluene sulfonic acid. With stirring the mixture was heated to a refluxing temperature (ranging from about 190° to 200° C.) and maintained thereat until about 2 milliliters of water had been collected, a period requiring about 4 hours. The heating was then continued for a period of about 4 additional hours in an attempt to drive the reaction to form further reaction products. No further reaction took place, however, and no more water was collected. The reaction mixture was then cooled, mixed with toluene and then washed first with a saturated sodium bicarbonate solution until the washings were alkaline and then with a water wash. The washed mixture was then distilled to remove the toluene and excess amines. The residue was analyzed by gas liquid chromatography to indicate that the residue was primarily a mixture of 4-hydroxydiphenylamine and N-(4-hydroxyphenyl)-2-methylphenylamine of a yield above about 90 percent of theory.

I claim as my invention:

1. In the process of reacting an arylamine of the benzene or naphthalene series with a dihydroxy aryl compound of the benzene or naphthalene series to form a hydroxy substituted diarylamine, the improvement which comprises effecting the reaction in the presence, as a catalyst, of an aryl sulfonic acid of the benzene or naphthalene series.

2. The process according to claim 1 wherein the aryl sulfonic acid is a lower alkyl substituted benzene sulfonic acid.

3. The process according to claim 2 wherein the sulfonic acid is p-toluene sulfonic acid.

4. The process according to claim 1 wherein the arylamine is reacted with the dihydroxy aryl compound in a ratio ranging from about 1.5 to 6 mols of the arylamine per mol of the dihydroxy aryl compound and the aryl sulfonic acid is present in an amount ranging from about 1 to 35 percent based upon the weight of the dihydroxy aryl compound.

5. The process according to claim 1 wherein a primary arylamine is reacted with the dihydroxy aryl compound in a ratio ranging from about 1.5 to 4 mols of the arylamine per one mol of the dihydroxy aryl compound, the sulfonic acid is a lower alkyl substituted benzene sulfonic acid which is present in a catalytic amount ranging from about 1 to 35 percent based upon the weight of the dihydroxy aryl compound, the reaction is effected at a temperature ranging from about 100° to 250° C. and is terminated when substantially one mol of water per one mol of the dihydroxy compound has formed.

6. The process according to claim 1 wherein a hydroxy substituted diphenylamine is prepared by reacting a primary phenylamine with a dihydric phenol.

7. The process according to claim 6 wherein a mixture of hydroxy substituted diphenylamines is prepared by reacting a mixture of primary phenylamines with a dihydric phenol.

8. The process according to claim 6 wherein the sulfonic acid is a lower alkyl substituted benzene sulfonic acid.

9. The process according to claim 8 wherein the sulfonic acid is p-toluene sulfonic acid.

10. The process according to claim 6 wherein the primary phenylamine is reacted with the dihydric phenol in a ratio ranging from about 1.5 to 6 mols of the amine per one mol of the dihydric phenol, and the sulfonic acid is present in an amount ranging from about 1 to 35 percent based upon the weight of the dihydric phenol.

11. The process according to claim 6 wherein the primary phenylamine is reacted with the dihydric phenol in a ratio ranging from about 1.5 to 4 mols of the amine per one mol of the dihydric phenol, the sulfonic acid is a lower alkyl substituted benzene sulfonic acid which is present in an amount ranging from about 1 to 35 percent based upon the weight of the dihydric phenol, the reaction is effected in the presence of a solvent and at a temperature ranging from about 100° to 250° C. and is terminated when substantially one mol of water per one mol of the dihydric phenol has formed.

12. The process according to claim 6 wherein the dihydric phenol is hydroquinone.

13. The process according to claim 6 wherein the dihydric phenol is resorcinol.

14. The process according to claim 6 wherein the phenylamine is aniline.

15. The process according to claim 6 wherein the phenylamine is methylaniline.

16. The process according to claim 7 wherein the mixture of phenylamines comprises aniline and o-methylaniline.

References Cited

Descamps, C. A., vol. 18, 1924, p. 1822.

CHARLES B. PARKER, *Primary Examiner.*

P. C. IVER, *Assistant Examiner.*

U.S. Cl. X.R.

252—426; 260—505, 576